Sept. 5, 1933.    W. FERRIS    1,926,012
PRESSURE PAD
Filed May 1, 1930    2 Sheets-Sheet 1

Inventor
WALTER FERRIS.
By [signature]
Attorney

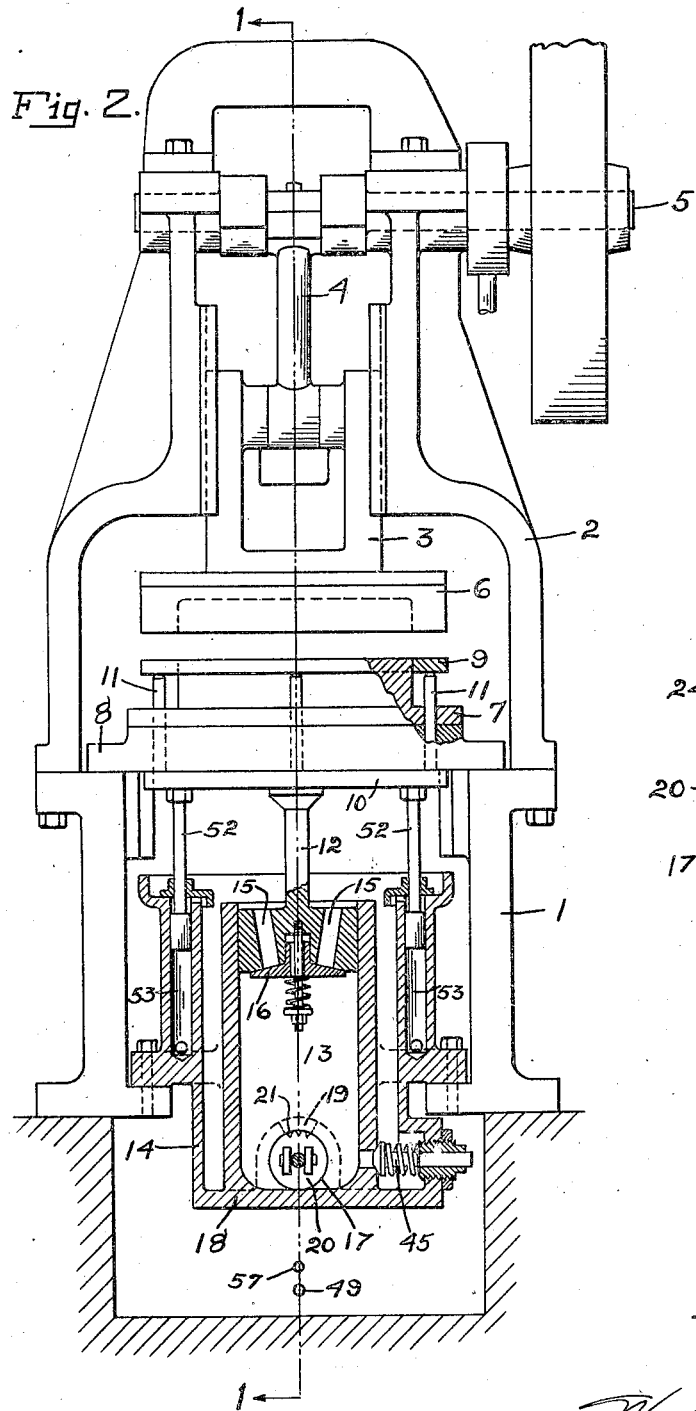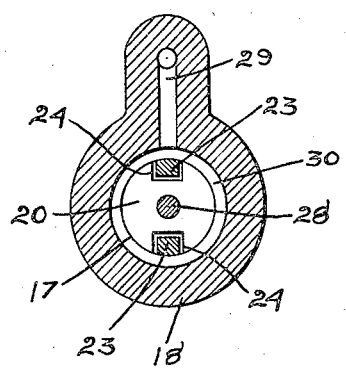

Patented Sept. 5, 1933

1,926,012

UNITED STATES PATENT OFFICE 1,926,012

PRESSURE PAD

Walter Ferris, Milwaukee, Wis., assignor to The Oilgear Company, Milwaukee, Wis., a corporation of Wisconsin Application May 1, 1930. Serial No. 448,980

23 Claims. (Cl. 113—46)

This invention relates to hydraulic pressure pads for draw presses and the like.

The pressure pad to which the invention applies in particular has a pressure ring to hold the blank against the movable die during the draw stroke of the press and to strip the formed article from the stationary die after the same has been drawn to shape, a piston supporting the pressure ring and arranged in a liquid filled cylinder from which the liquid is expelled through restricted orifices as the piston moves inwardly, means to vary the effective orifice area through which liquid is expelled during the instroke of the piston and thereby regulate the pressure within the cylinder in accordance with the movement of the piston and thus control the pressure applied to the blank by the pressure ring, and means to supply liquid to the cylinder at high pressure to force the piston upwardly and strip the formed article from the stationary die after the movable die has moved therefrom. Such a pressure pad is disclosed in Patent 1,696,140, issued December 18, 1928 to Walter Ferris.

The present invention has as an object to provide a pressure pad in which the expulsion of liquid from the cylinder is controlled by a valve which is operated by liquid pressure to vary the effective orifice area through which liquid may be expelled.

Another object is to control the pressure in the cylinder throughout the working stroke of the press.

Another object is to vary the pressure in the cylinder during the working stroke of the press.

Another object is to provide a pressure pad which may be readily and easily adjusted to regulate the pressures created in the cylinder during the working stroke of the press.

Another object is to provide a hydraulic pressure pad which is susceptible of close control.

Another object is to provide a valve which has restricted orifices for the passage of liquid and which is adjustable to vary the effective orifice area.

According to the invention in its general aspect, the pressure pad is provided with a piston and a cylinder, the expulsion of liquid from the cylinder during the instroke of the piston is resisted and controlled by a valve which causes the piston to create pressure in the cylinder, and the valve is operated by means responsive to the pressure in the cylinder to vary and control that pressure.

According to the invention in another aspect, the pressure pad is provided with a valve which has grooves or ducts formed therein to provide a restricted outlet for the escape of liquid from the cylinder and which is adjustable to vary the effective cross-sectional area of the grooves or ducts through which liquid may flow.

The invention is illustrated by the pressure pad shown in the accompanying drawings in which the views are as follows:

Fig. 2 is in part a vertical section and in part an elevation taken substantially on a line 2—2 of Fig. 1.

Fig. 3 is a section on a line 3—3 of Fig. 1.

Figure 1:
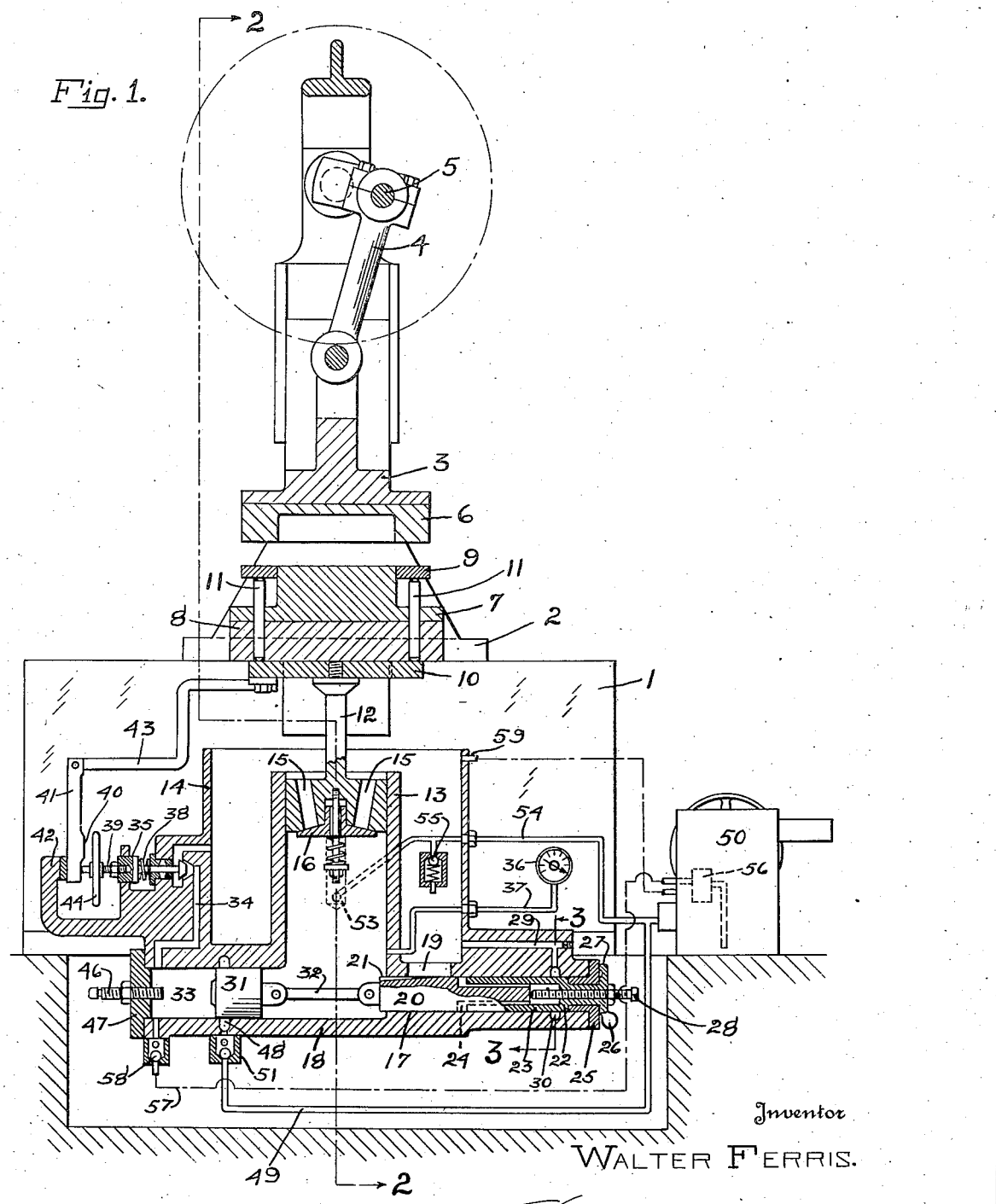
Fig. 1 is a central longitudinal section through the pressure pad and through a crank-operated press to which the pressure pad is shown applied, the view being taken in the plane of the line 1—1 of Fig. 2.

The pressure pad is shown applied to an upright crank-operated draw press but the invention is not limited to this particular application.

The draw press has a bed 1, a frame 2 supported thereby, a ram 3 guided by the frame 2 and connected by a connecting rod 4 to a crankshaft 5 which is journaled in the upper end of the frame 2, and a die 6 which is carried by the ram 3 and cooperates with a stationary die 7 arranged upon a bolster 8 carried by the bed 1.

The blank, from which an article is to be formed by the dies 6 and 7, is held firmly against the upper die 6 during the drawing operation by a pressure ring 9 which encircles the lower die 7 and is supported from a pressure plate 10 by pins 11 which are slidable through the bolster 8 and the flange of the die 7.

The function of the pressure pad is to support the pressure plate 10 and resist the downward movement thereof under the influence of the ram 3 so as to maintain the required pressure between the pressure ring 9 and the die 6 to grip the blank therebetween, to strip the finished work from the lower die, and to return the pressure ring 9 to its initial position.

The downward movement of the pressure plate 10 is resisted primarily by a piston 12 which is attached thereto and reciprocable in a cylinder 13 arranged within and carried by a reservoir 14 containing a liquid, such as oil, the level of which is maintained above the upper end of the cylinder 13. The piston 12 is provided with passageways 15 through which liquid may flow as the piston moves upwardly to keep the cylinder flooded at all times and which are normally closed by a check valve 16.

The lower end of the cylinder 13 communicates with a transverse bore or cylinder 17 which is shown formed in the base 18 of the reservoir 14 and provided with an arcuate port 19 opening into the reservoir, the bore 17 and the port 19 constituting the outlet from the cylinder 13.

The port 19 is controlled by a plunger valve 20 which is arranged in the bore 17 and is responsive to the hydraulic pressure within the cylinder 13. The valve 20 is provided around a part of its periphery with longitudinally tapered grooves 21 which register with the port 19 and provide outlet orifices through which liquid is expelled from the cylinder 13.

The grooves 21 are largest at the inner ends thereof and terminate upon the periphery of the valve 20 so that inward movement of the valve gradually restricts the orifice area through which liquid may be expelled and finally closes the port 19.

The resistance of the liquid in the cylinder 13 to the downward movement of the piston 12 is dependent upon the speed of the ram 3 relatively to the total cross-sectional area of the orifices through which the liquid is expelled from the cylinder, and the pressure in the cylinder 13 can be regulated by rotating the valve to vary the number of grooves in communication with the port 19.

The valve may be rotated by a sleeve 22 arranged in the bore 17 and provided with two prongs 23 which engage two slots 24 in the valve 20. The outer end of the sleeve 22 is reduced in diameter and extended through a cap or gland 25 which is attached to the base 18, and the sleeve 22 is rotated by a handle 26 which is attached to its outer end and provided with a pointer 27 to indicate the number of grooves 21 in communication with the port 19.

In order to compensate for variations in the movement of the pressure ring 9, caused by forming articles of different depths, the valve 20 may be adjusted axially by a screw 28 which is threaded through the outer end of the sleeve 22 and engages the valve when the same is in its initial position.

The piston 12 does not move downwardly at a uniform rate of speed due to the ram 3 being actuated by a crank and the amount of liquid expelled per unit of time from the cylinder 13 diminishes in proportion to the reduction in speed of the piston. In order to maintain the desired pressure in the cylinder, the plunger valve 20 moves inwardly in response to the hydraulic pressure in the cylinder 13 to progressively reduce the effective cross-sectional areas of the tapered grooves 21.

The inward movement of the valve 20 tends to create a vacuum in the outer end of the bore 17 and this tendency is overcome by admitting liquid from the reservoir 14 through a duct 29 which is formed in the base 18 and has one end opening into the reservoir and the other end opening into an annular groove 30 formed in the wall of the bore 17.

When the piston 12 moves downwardly, the hydraulic pressure created in the cylinder 13 moves the valve 20 inwardly by acting upon a valve piston 31 which has a greater cross-sectional area than the valve 20 and is connected thereto by a connecting rod 32 and forms substantially a part thereof. The valve piston 31 is arranged in a valve cylinder 33 which communicates with the cylinder 13 and the liquid in the rear end thereof resists the forward movement of the valve piston 31.

The liquid in the valve cylinder 33 is expelled into the reservoir 14 through a duct 34 which is formed in the base 18 and controlled by a regulating valve 35. The rate of flow of the liquid through the duct 34 determines the rate of movement of the valve 20 and consequently determines the pressure or pressures created in the cylinder 13, which may be indicated upon a pressure gage 36 connected to the cylinder 13 by a pipe 37.

The regulating valve 35 is urged toward open position by a helical compression spring 38 and toward closed position by a screw 39 which is threaded into its outer end. The spring 38 holds the outer end of the screw 39 against a cam face 40 on a bar 41 which is guided at its lower end by a bracket 42 and connected at its upper end to an arm 43 carried by the pressure plate 10. The screw 39 may be moved axially by the cam face 40 to adjust the valve 35 or the valve may be adjusted by turning a hand wheel 44 which is attached to screw 39.

The velocity of the ram of a crank-operated press diminishes during the working part of the stroke and, if the pressure pad is applied to such a press, the grooves 21 in the valve 20 are preferably tapered in proportion to the reduction in the velocity of the ram.

When the upper die 6 engages the blank to press the same over the lower die 7, the resistance of the liquid in the cylinder 13 causes the pressure ring 9 to press the margin of the blank against the die 6 and grip the same firmly therebetween during the entire forming operation, the valves 20 and 35 having been previously adjusted in accordance with the depth of the draw and to produce a predetermined initial pressure.

The pressure created in the cylinder 13 by the downward movement of the piston 12 causes the liquid to be expelled through the grooves 21 and the valve 20 to move inwardly against the liquid in the valve cylinder 33 which is expelled through the duct 34.

If the adjustment of the valve 35 remains the same during the entire working stroke of the press, the valve 20 will move inwardly at a substantially uniform speed under the influence of the pressure in the cylinder 13 and reduce the effective cross-sectional area of the tapered grooves 21 in accordance with the reduction in speed of the piston 12 as the crank of the crankshaft 5 approaches dead center.

If the grooves 21 are proportioned to control the expulsion of liquid from the cylinder 13 in accordance with the piston speed and a uniform pressure upon the pressure ring is desired during the entire forming operation, the valve 35 may be adjusted manually and the cam bar 41 disconnected from the arm 43 or a cam bar employed which has a straight vertical face.

If the grooves 21 are not proportioned to control the expulsion of liquid from the cylinder 13 in accordance with the piston speed or, if different pressures are desired upon the pressure ringe 9 during different parts of the forming operation, the screw 39 is adjusted to the lowest point upon the cam face 40 and the bar 41 is connected to the arm 43 to be moved in unison with the pressure ring 9.

The cam face 40 will operate the valve 35 to control the expulsion of liquid from the valve cylinder 33 and consequently control the speed of the valve 20 and the cross-sectional areas of the grooves 21 through which liquid is expelled to either maintain a uniform pressure in the cylinder 13 or to obtain different pressures therein during different parts of the forming operation, depending upon the contour of the cam face 40 which may be shaped to produce any pressure or variation in pressure in the cylinder 13, whether the ram 3 moves at a uniform speed or at a speed which varies according to any law of speed variation, such as the speed produced by a crank, as shown.

As the crank of the shaft 5 approaches lower dead center, the ram 3 and piston 12 are moving at a relatively slow speed and a relatively small amount of liquid is being expelled from the cylinder 13. The adjustment of the valve 20 is such that the grooves 21 move out of registry with the port 19 and the valve 20 closes the same just before the piston 12 reaches the limit of its downward stroke. Liquid is then expelled from the cylinder 13 through a relief valve 45 which is adjusted to open at that pressure which produces the desired maximum holding force against the blank.

The valve 20 has now reached the limit of its inward stroke and further movement thereof is prevented by the valve piston 31 engaging a stop screw 46 which is threaded through the head 47 of the valve cylinder 33.

As the valve piston 31 engages the stop screw 46, it uncovers a port 48 which is connected by a pipe 49 to a high pressure variable displacement pump 50, such as that disclosed in Patent No. 1,578,233, issued March 23, 1926 to Walter Ferris, and a check valve 51 is provided to protect the pump 50 from the high pressures created in the cylinder 13.

The downward movement of the pressure ring 9 is also opposed by small lifting pistons 52 which engage the pressure plate 10 and are reciprocable in lifting cylinders 53 arranged within and carried by the reservoir 14. The lifting cylinders 53 are connected at the bottoms thereof to the pump 50 by a pipe 54 and the liquid therein is discharged into the reservoir 14 through a relief valve 55 as the pistons 52 are forced downwardly during the forming operation.

As the ram 3 starts its upward stroke and relieves the pressure upon the pressure ring 9, the pump 50 delivers liquid at high pressure to the cylinders 53 to raise the pistons 52 and to the cylinder 13 to create sufficient pressure therein to strip the formed article from the die 7.

When the article is loosened from the die 7, the upward thrust of the lifting pistons 52 releases the pressure in the cylinder 13 and allows liquid to be delivered by a low pressure pump 56 to the valve cylinder 33 to retract the valve piston and close the port 48 so that the full output of the high pressure pump 50 is delivered to the lifting cylinders 53 to force the pistons upwardly and raise the pressure plate 10 and the parts carried thereby.

The low pressure pump 56 may be incorporated in the high pressure pump 50, as disclosed in Patent No. 1,619,200, issued March 1, 1927 to Walter Ferris, and is connected to the valve cylinder 33 by a pipe 57 and a check valve 58 which protects the pump 56 from the high pressures created in the valve cylinder 33 during the working stroke of the press.

The pressure plate 10 is raised rapidly by the lifting pistons 52, due to the small volumetric capacity of the cylinders 53, and carries the piston 12 upwardly which causes the check valve 16 to open and liquid to flow from the reservoir 14 through the passageways 15 to fill the cylinder 13. At the same time, liquid delivered by the low pressure pump 56 is returning the valve piston 31 and the valve 20 to their initial positions and excess liquid delivered by the pumps is returned from the reservoir 14 to the sump of the pump 50 through an overflow pipe 59. As soon as the piston 31 moves toward its initial position, it closes the port 48 and the full output of the high pressure pump 50 is directed into the lifting cylinders 53 to raise the pistons 52 at an increased speed.

The pressure pad herein set forth is susceptible of various modifications and adaptations without departing from the scope of the invention as hereafter claimed.

The invention is hereby claimed as follows:

1. A hydraulic pressure pad, comprising a pressure member, hydraulic means for sustaining said member including a piston and a cylinder, and means providing a restricted passageway for the escape of liquid from said cylinder and responsive to hydraulic pressure in said cylinder to reduce the cross-sectional area of said passageway.

2. A hydraulic pressure pad, comprising a pressure member, hydraulic means for sustaining said member including a piston and a cylinder, and a valve providing a restricted passageway for the escape of liquid from said cylinder and movable by hydraulic pressure therein to reduce the effective cross-sectional area of said passageway.

3. A hydraulic pressure pad, comprising a pressure member, hydraulic means for sustaining said member including a piston and a cylinder having an outlet, and a valve having tapered grooves for controlling the discharge of liquid from said cylinder through said outlet and responsive to hydraulic pressure in said cylinder to vary the resistance to the discharge of said liquid.

4. A hydraulic pressure pad, comprising a pressure member, hydraulic means for sustaining said member including a piston and a cylinder having an outlet, and a valve having tapered grooves for controlling the discharge of liquid from said cylinder through said outlet and adjustable to vary the resistance to the discharge of said liquid.

5. A hydraulic pressure pad, comprising a pressure member, hydraulic means for sustaining said member including a piston and a cylinder having an outlet, and a valve having tapered grooves for controlling the discharge of liquid from said cylinder through said outlet and movable to vary the effective area through which liquid may be discharged.

6. A hydraulic pressure pad, comprising a pressure member, hydraulic means for sustaining said member including a piston and a cylinder having an outlet, a valve having tapered grooves for controlling the discharge of liquid from said cylinder through said outlet and movable to vary the effective area through which liquid may be discharged, and means for adjusting said valve radially to vary the cross-sectional grooves area communicating with said outlet.

7. A hydraulic pressure pad, comprising a pressure member, hydraulic means for sustaining said member including a piston and a cylinder having an outlet, a valve having tapered grooves for controlling the discharge of liquid from said cylinder through said outlet and responsive to hydraulic pressure in said cylinder to vary the effective area through which said liquid may be discharged, and means for adjusting said valve to vary the number of grooves communicating with said outlet.

8. A hydraulic pressure pad, comprising a pressure member, hydraulic means for sustaining said member including a piston and a cylinder having an outlet, a valve having tapered grooves for controlling the discharge of liquid from said cylinder through said outlet and movable to vary the effective area through which liquid may be discharged, and means for adjusting the initial position of said valve to vary the effective cross-sectional area of the grooves in communication with said outlet.

9. A hydraulic pressure pad, comprising a pressure member, hydraulic means for sustaining said member including a piston and a cylinder having an outlet, a valve having tapered grooves for controlling the discharge of liquid from said cylinder through said outlet and reciprocable to vary the effective area through which said liquid may be discharged, means for adjusting said valve to vary the number of grooves communicating with said outlet, and means for adjusting the initial position of said valve to vary the effective cross-sectional area of the grooves in communication with said outlet.

10. A hydraulic pressure pad, comprising a pressure member, hydraulic means for sustaining said member including a piston and a cylinder having an outlet, a valve for controlling the flow of liquid from said cylinder through said outlet, hydraulic means for regulating the operation of said valve, and means operated in accordance with the movement of said pressure member for operating said regulating means to thereby control the pressure in said cylinder during the entire stroke of said piston.

11. A hydraulic pressure pad, comprising a pressure member, hydraulic means for sustaining said member including a piston and a cylinder having an outlet, a hydraulically operated valve for controlling the flow of liquid from said cylinder through said outlet, hydraulic means for regulating the operation of said valve, and means for adjusting said hydraulic regulating means in accordance with the movement of said pressure member.

12. A hydraulic pressure pad, comprising a pressure member, hydraulic means for sustaining said member including a piston and a cylinder having an outlet, a valve responsive to hydraulic pressure in said cylinder for controlling the flow of liquid from said cylinder through said outlet, hydraulic means for regulating the operation of said valve, and means for adjusting said hydraulic regulating means in accordance with the movement of said pressure member.

13. A hydraulic pressure pad, comprising a pressure member, hydraulic means for sustaining said pressure member including a piston and a cylinder having an outlet, a valve for controlling the discharge of liquid from said cylinder through said outlet, and auxiliary cylinder communicating at one end with said sustaining cylinder and having a relief outlet at the other end thereof, a valve piston of greater cross-sectional area than said valve carried thereby and arranged in said auxiliary cylinder to move said valve in response to hydraulic pressure in said sustaining cylinder and thereby vary the effective cross-sectional area through which liquid may be discharged from said sustaining cylinder, and means for regulating the discharge of liquid through said relief outlet to control the movement of said valve piston.

14. A hydraulic pressure pad, comprising a pressure member, hydraulic means for sustaining said pressure member including a piston and a cylinder having an outlet, a valve having tapered grooves communicating with said outlet to control the discharge of liquid from said cylinder through said outlet, an auxiliary cylinder communicating at one end with said sustaining cylinder and having a relief outlet at the other end thereof, a valve piston of greater cross-sectional area than said valve carried thereby and arranged in said auxiliary cylinder to move said valve in response to hydraulic pressure in said sustaining cylinder and thereby control the pressure in said sustaining cylinder, and means for regulating the discharge of liquid through said relief outlet to control the movement of said valve piston.

15. A hydraulic pressure pad, comprising a pressure member, hydraulic means for sustaining said pressure member including a piston and a cylinder having an outlet, a valve having tapered grooves communicating with said outlet to control the discharge of liquid from said cylinder through said outlet, means for adjusting said valve to vary the cross-sectional groove area communicating with said outlet, an auxiliary cylinder communicating at one end with said sustaining cylinder and having a relief outlet at the other end thereof, a valve piston of greater cross-sectional area than said valve connected thereto and arranged in said auxiliary cylinder to move said valve in response to hydraulic pressure in said sustaining cylinder and thereby control the pressure in said sustaining cylinder, and means for regulating the discharge of liquid through said relief outlet to control the movement of said valve piston.

16. A hydraulic pressure pad, comprising a pressure member, hydraulic means for sustaining said pressure member including a piston and a cylinder having an outlet, a valve having tapered grooves communicating with said outlet to control the discharge of liquid from said cylinder through said outlet, means for adjusting the initial position of said valve to vary the effective cross-sectional area of the grooves in communication with said outlet, an auxiliary cylinder communicating at one end with said sustaining cylinder and having a relief outlet at the other end thereof, a valve piston of greater cross-sectional area than said valve carried thereby and arranged in said auxiliary cylinder to move said valve in response to hydraulic pressure in said sustaining cylinder and thereby control the pressure in said sustaining cylinder, and means for regulating the discharge of liquid through said relief outlet to control the movement of said valve piston.

17. A hydraulic pressure pad, comprising a pressure member, hydraulic means for sustaining said pressure member including a piston and a cylinder having an outlet, a valve having tapered grooves communicating with said said outlet to control the discharge of liquid from said cylinder through said outlet, means for adjusting said valve radially to vary the cross-sectional groove area communicating with said outlet, means for adjusting the initial position of said valve to vary the effective cross-sectional area of the grooves in communication with said outlet, an auxiliary cylinder communicating at one end with said sustaining cylinder and having a relief outlet at the other end thereof, a valve piston of greater cross-sectional area than said valve carried thereby and arranged in said auxiliary cylinder to move said valve in response to hydraulic pressure in said sustaining cylinder and thereby control the pressure in said sustaining cylinder, and means for regulating the discharge of liquid through said relief outlet to control the movement of said valve piston.

18. A hydraulic pressure pad, comprising a pressure member, hydraulic means for sustaining said pressure member including a piston and a cylinder having an outlet, a valve for controlling the discharge of liquid from said cylinder through said outlet, an auxiliary cylinder communicating at one end with said sustaining cylinder and having a relief outlet at the other end thereof, a valve piston of greater cross-sectional area than said valve connected thereto and arranged in said auxiliary cylinder to move said plunger valve in response to hydraulic pressure in said sustaining cylinder and thereby vary the effective cross-sectional area through which liquid may be discharged from said sustaining cylinder, a valve for regulating the discharge of liquid through said relief outlet to control the movement of said valve piston, and means operated in accordance with the movement of said pressure member to adjust said relief valve and control the pressure in said sustaining cylinder during the entire stroke of said piston.

19. A hydraulic pressure pad, comprising a pressure member, hydraulic means for sustaining said pressure member including a piston and a cylinder having an outlet, a valve for controlling the discharge of liquid from said cylinder through said outlet, an auxiliary cylinder communicating at one end with said sustaining cylinder and having a relief outlet at the other end thereof, a valve piston of greater cross-sectional area than said valve carried thereby and arranged in said auxiliary cylinder to move said valve in response to hydraulic pressure in said sustaining cylinder and thereby vary the effective cross-sectional area through which liquid may be discharged from said sustaining cylinder, a valve for regulating the discharge of liquid through said relief outlet to control the movement of said valve piston, means controlled by said valve piston to connect said auxiliary cylinder to a source of high pressure liquid after said piston has reached the limit of its inward stroke to supply liquid to said sustaining cylinder at high pressure and force said piston outwardly and means to return said valve to its initial position.

20. A hydraulic pressure pad, comprising a pressure member, hydraulic means for sustaining said pressure member including a piston and a cylinder having an outlet, a valve for controlling the discharge of liquid from said cylinder through said outlet, an auxiliary cylinder communicating at one end with said sustaining cylinder and having a relief outlet at the other end thereof, a valve piston of greater cross-sectional area than said valve carried thereby and arranged in said auxiliary cylinder to move said valve in response to hydraulic pressure in said sustaining cylinder and thereby vary the effective cross-sectional area through which liquid may be discharged from said sustaining cylinder, a valve for regulating the discharge of liquid through said relief outlet to control the movement of said valve piston, means controlled by said valve piston to connect said auxiliary cylinder to a source of high pressure liquid after said piston has reached the limit of its inward stroke to supply liquid to said sustaining cylinder at high pressure and force said piston outwardly, and means connecting said auxiliary cylinder to a source of low pressure liquid for supplying liquid thereto at low pressure to return said valve to its initial position.

21. A hydraulic pressure pad, comprising a pressure member, hydraulic means for sustaining said member including a piston and a cylinder having an outlet, means for resisting the flow of liquid through said outlet, and hydraulic means responsive to the fluid pressure in said cylinder for varying the resistance to the flow of liquid through said outlet.

22. A hydraulic pressure pad, comprising a pressure member, hydraulic means for sustaining said member including a piston and a cylinder having an outlet, means for resisting the flow of liquid through said outlet, and hydraulic means acted upon by the liquid in said cylinder and responsive to the pressure thereof for varying the resistance to the flow of liquid through said outlet.

23. A hydraulic pressure pad, comprising a pressure member, hydraulic means for sustaining said member including a piston and a cylinder having an outlet, a valve for controlling the rate of flow of liquid through said outlet, and hydraulic means responsive to the fluid pressure in said cylinder for operating said valve.

WALTER FERRIS.